(12) United States Patent
Wojtuś et al.

(10) Patent No.: US 12,505,762 B2
(45) Date of Patent: Dec. 23, 2025

(54) LINERLESS WASH OFF LABEL

(71) Applicant: UPM Raflatac Oy, Tampere (FI)

(72) Inventors: Katarzyna Wojtuś, Helsinki (FI); Juha Kivimäki, Helsinki (FI); Malgorzata Huaman, Helsinki (FI)

(73) Assignee: UPM Raflatac Oy, Tampere (FI)

( * ) Notice: Subject to any disclaimer, the term of this patent is extended or adjusted under 35 U.S.C. 154(b) by 0 days.

(21) Appl. No.: 18/932,885

(22) Filed: Oct. 31, 2024

(65) Prior Publication Data

US 2025/0148939 A1    May 8, 2025

(30) Foreign Application Priority Data

Nov. 3, 2023    (FI) .................................. 20236229

(51) Int. Cl.
   *B32B 7/12*          (2006.01)
   *B65D 25/20*       (2006.01)
   (Continued)

(52) U.S. Cl.
   CPC .............. *G09F 3/0291* (2013.01); *B32B 7/12* (2013.01); *B65D 25/205* (2013.01); *C09J 5/00* (2013.01);
   (Continued)

(58) Field of Classification Search
   CPC ........... B32B 7/12; B32B 27/10; B32B 29/00; G09F 3/0219; G09F 3/10; G09F 2003/0241; C09J 7/21
   See application file for complete search history.

(56) References Cited

U.S. PATENT DOCUMENTS

| | | | |
|---|---|---|---|
| 5,674,626 A | 10/1997 | Khatib et al. | |
| 2006/0124239 A1* | 6/2006 | Marshall | ................... G09F 3/10 428/343 |

(Continued)

FOREIGN PATENT DOCUMENTS

| | | |
|---|---|---|
| JP | H10131098 A | 5/1998 |
| JP | H10140104 A | 5/1998 |

(Continued)

OTHER PUBLICATIONS

European Search Report for the corresponding European Application No. 24208986, Date of Mailing: Mar. 26, 2025; 5 pages.

(Continued)

*Primary Examiner* — Elizabeth E Mulvaney
(74) *Attorney, Agent, or Firm* — Nixon Peabody LLP

(57) ABSTRACT

A linerless wash-off label (100) comprising a paper-based face (101, 201) and pressure sensitive adhesive (102) is provided. The paper-based face (101, 201) comprises a base paper (206) and a release layer (203), and the release layer (203) and the pressure sensitive adhesive (102) are arranged on opposite sides of the base paper (206). The pressure sensitive adhesive (102) comprises a water-based acrylic emulsion polymer composition, the pressure sensitive adhesive (102) is sensitive to washing conditions, and the base paper (206) comprises wet strength resin and has water absorptiveness of from 10 to 30 $g/m^2$ when measured according to an ISO standard 535 (contact time 60 s). Further, a label product roll comprising the linerless wash-off labels (100) as well as a labelled item comprising an item and a linerless wash-off (100) label are provided. Still (Continued)

further, use of the linerless wash-off label (100) and method of manufacturing a linerless wash-off label web for providing the linerless label product roll are provided.

17 Claims, 1 Drawing Sheet

(51) Int. Cl.
  *C09J 5/00* (2006.01)
  *C09J 7/21* (2018.01)
  *C09J 7/38* (2018.01)
  *G09F 3/00* (2006.01)
  *G09F 3/10* (2006.01)
  *G09F 3/02* (2006.01)

(52) U.S. Cl.
  CPC ............... *C09J 7/21* (2018.01); *C09J 7/385* (2018.01); *G09F 3/10* (2013.01); *C09J 2203/334* (2013.01); *C09J 2301/204* (2020.08); *C09J 2301/302* (2020.08); *C09J 2301/408* (2020.08); *C09J 2301/41* (2020.08); *C09J 2301/502* (2020.08); *G09F 2003/0241* (2013.01); *G09F 2003/0242* (2013.01)

(56) References Cited

U.S. PATENT DOCUMENTS

| | | | |
|---|---|---|---|
| 2009/0211705 A1* | 8/2009 | Tonniessen | C09J 153/025 156/60 |
| 2022/0097337 A1 | 3/2022 | Tiainen et al. | |
| 2025/0118226 A1* | 4/2025 | Pirkkanen | C08F 8/32 |
| 2025/0145865 A1* | 5/2025 | Kivimäki | G09F 3/10 |

FOREIGN PATENT DOCUMENTS

| | | |
|---|---|---|
| JP | H10203018 A | 8/1998 |
| JP | H10297091 A | 11/1998 |
| JP | 2013020248 A | 1/2013 |
| JP | 2014032241 A | 2/2014 |
| JP | 2022060160 A | 4/2022 |
| JP | 2022-149140 * | 10/2022 |
| WO | 2015118215 A1 | 8/2015 |
| WO | 2016147630 A1 | 9/2016 |
| WO | 2020260765 A1 | 12/2020 |

OTHER PUBLICATIONS

European Search Report for the corresponding European Application No. 24208988, Date of Mailing: Mar. 26, 2025; 7 pages.

* cited by examiner

LINERLESS WASH OFF LABEL

TECHNICAL FIELD

This specification relates to a linerless wash-off label, a label product roll comprising the linerless wash-off labels as well as a labelled item comprising an item and a linerless wash-off label. Further, the specification relates to use of the linerless wash-off label and method of manufacturing a linerless wash-off label web for providing the linerless label product roll.

BACKGROUND

It is general practice to apply a label to the surface of containers to provide identification and/or information, for example, on the contents of the container. In case of returnable and/or reusable containers, there is a need for labels which are easily removed from the surface of the container by washing. Particularly, the labels need to be fully detached in the washing process, for example leaving no adhesive remnants on the container. Further, particularly for returnable and/or reusable food containers, it may be important to have a label which shows opening marks in case the container has been opened. Further, it is desirable to have a label that is printable with linerless printer.

SUMMARY

This specification provides a linerless wash-off label that is easily and quickly fully detachable in mild washing conditions. Further, the label is printable with a linerless printer, and the label is capable of sealing a container and showing opening marks in case the container has been opened.

According to an embodiment, a linerless wash-off label comprising a paper-based face and pressure sensitive adhesive is provided. The paper-based face comprises a base paper and a release layer, and the release layer and the pressure sensitive adhesive are arranged on opposite sides of the base paper. The pressure sensitive adhesive comprises a water-based acrylic emulsion polymer composition. The pressure sensitive adhesive is sensitive to washing conditions, and the base paper comprises wet strength resin and has water absorptiveness of from 10 to 30 g/m² when measured according to an ISO standard 535 (contact time 60 s).

Further, a linerless label product roll comprising the linerless wash-off labels described herein is provided.

According to another embodiment, a labelled item comprising an item and a linerless wash-off label described herein is provided. The linerless wash-off label is attached to a surface of the item via the pressure sensitive adhesive of the linerless wash-off label.

Further, use of the linerless wash-off label described herein for labelling an item is provided.

According to yet another embodiment, a method of manufacturing a linerless wash-off label web for providing the linerless label product roll is provided. The method comprises
arranging a paper-based face or a carrier as a substrate,
coating the substrate with pressure sensitive adhesive,
drying and/or curing the pressure sensitive adhesive on the substrate,
in case of the substrate being a carrier, transferring the pressure sensitive adhesive from the carrier to a paper-based face, and
winding the paper-based face with the adhesive thereon into a roll of linerless wash-off label web,
the paper-based face comprising a base paper and a release layer,
wherein
the pressure sensitive adhesive and the release layer are arranged on opposite sides of the base paper,
the pressure sensitive adhesive comprises a water-based acrylic emulsion polymer composition,
the pressure sensitive adhesive is sensitive to washing conditions,
and
the base paper comprises wet strength resin and has water absorptiveness of from 10 to 30 g/m² when measured according to an ISO standard 535 (contact time 60 s).

Figure 1:
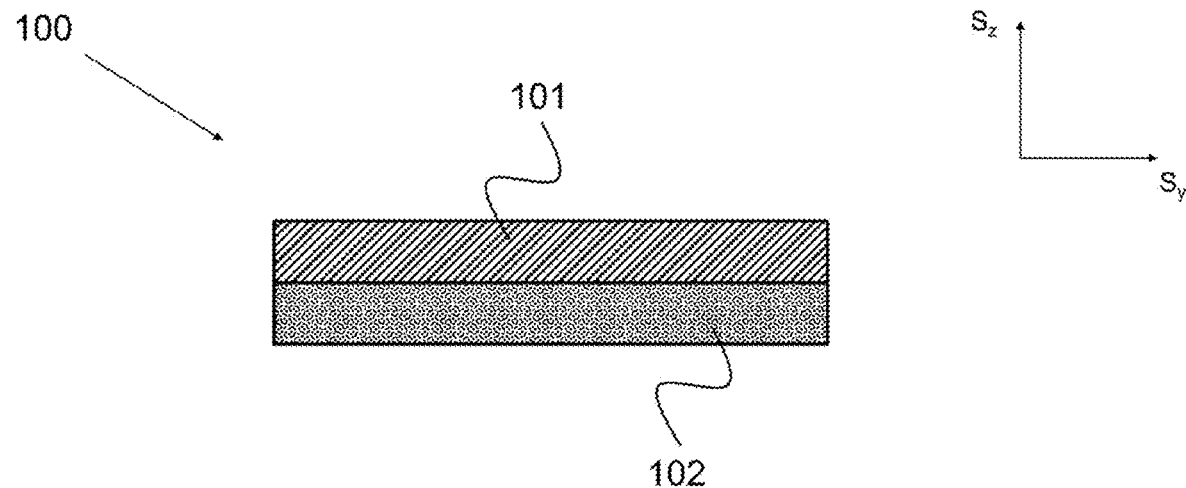
FIG. 1 illustrates, by way of an example, a cross-sectional view of a linerless wash-off label.

The figures are schematic and are not in particular scale.

DETAILED DESCRIPTION

The solution is described in the following in more detail with reference to some embodiments, which shall not be regarded as limiting.

In this description and claims, the percentage values relating to an amount of a material are percentages by weight (wt. %) unless otherwise indicated. Unit of thickness expressed as microns corresponds to µm. Unit of temperature expressed as degrees C. corresponds to ° C. The following reference numbers and denotations are used in this application:

100 linerless wash-off label
101, 201 paper-based face
102 pressure sensitive adhesive
203 release layer
204 thermal layer
205 pre-coating
206 base paper
207 barrier layer A label is a piece of material to be applied onto articles or items of different shapes and materials. An article or an item may be a package. A label comprises at least a face material also referred to as a face stock or a face. A typical way to adhere the label onto an article or an item is by use of adhesive. The label comprising an adhesive layer is referred to as an adhesive label. The adhesive may comprise pressure sensitive adhesive (PSA). A label comprising pressure sensitive adhesive may be referred to as a pressure sensitive adhesive label. Pressure sensitive adhesive labels may also be referred to as self-adhesive labels.

The labels comprising PSA can be adhered to most surfaces through an adhesive layer without the use of a secondary agent, such as a solvent, or heat to strengthen the bond. In that case the adhesive is pressure sensitive as such. Alternatively, the adhesive may be activatable in order to be pressure sensitive. The PSA forms a bond when pressure is applied onto the label at ambient temperature (e.g. between 15 and 35 degrees C.) or for cold applications even under freezing temperatures below 0 degrees C. or for hot applications in temperatures above 35 degrees C., adhering the label to the item/article to be labelled. Examples of pressure sensitive adhesives include water-based (water-borne)

PSAs, solvent based PSAs and hot-melt PSAs. A label may further comprise other adhesive(s).

Labels may be used in wide variety of labelling applications and end-use areas, such as labelling of food, home and personal care products, industrial products, pharmaceutical and health care products, beverage and wine bottles, other consumables etc. Labels enable providing information, like product specification, on the labelled product(s). Information, e.g. print of a label, may comprise human-readable information, like image(s), logo(s), text, and/or machine-readable information, like bar code(s), QR (Quick Response) code(s). The surface of the labelled article/item may be for example plastics, glass, metal, or paper based. The labelled article/item may be for example a container, such as a bottle, jar, canister, can, tin or the like. The label may also be applied to semi-rigid or flexible packages used for e.g. packaging of food.

Term "face" refers to a top substrate of the label, also called as a face stock or a face material. The face may have a monolayer structure or a multilayer structure comprising at least two layers. The face is the layer that is adhered to the surface of an article/item during labelling through an adhesive layer. The face comprises an adhesive side and a print side. A combination comprising a face and adhesive may be referred to as an adhesive label. The face may comprise e.g. print in order to provide information and/or visual effect. Printable face is suitable for printing by any known printing methods, such as with gravure, flexographic process, offset, screen or letter-press. The print may exist on a top surface, reverse side or both top and reverse side of the face. Further, the label may contain additional layers, for example top coatings or overlaminates to protect the top surface and/or print of the label against rubbing or other external stress. Coating or additional layers, such as a primer, may enable enhancing compatibility of adjacent layers or parts of the label, for example adhesion between the layers. A label comprising a face, a print layer and an adhesive may be referred to as a printed label.

Term "web" refers to a continuous sheet of material. The web is generally processed by moving over rollers. Between processing stages, webs may be stored and transported as rolls.

Term "machine direction" or MD refers to manufacturing direction of a web. Machine direction may also refer to a circumferential direction of a roll. Term "cross direction" or "cross machine direction" or CD refers to a direction that is transversal to the machine direction.

This specification aims to provide a linerless wash-off label. Generally, the term "linerless label" refers to a label that comprises a mono- or multilayer face and an adhesive on the face.

As illustrated in FIG. 1, the linerless wash-off label 100 disclosed herein comprises or consists of a paper-based face 101 and pressure sensitive adhesive 102.

A wash-off label, also referred to as a washable label, refers to a label removable (detachable) from a surface of an item attached to during subsequent washing process. A wash-off label comprises an adhesive sensitive to washing conditions. Washability of the label is required for recycling and/or reuse of the labelled items. For example, washability of a label may be needed for reuse of food containers.

Adhesive sensitive to washing conditions refers to an adhesive having decreased adhesion at washing conditions. The adhesive sensitive to washing conditions is able to reduce its adhesion (tackiness) in washing conditions. The washing conditions generally comprise alkaline conditions (washing solution) and/or elevated temperature.

The linerless wash-off label disclosed herein can be used for labelling an item to a form a labelled item. The labelled item comprises an item and a linerless wash-off label as disclosed herein. The linerless wash-off label is attached to a surface of the item via the pressure sensitive adhesive of the linerless wash-off label. The item may be a plastic item, glass item or metal item. The item may be a container. The container may comprise a lid, and in the labelled container one end of the linerless wash-off label is attached to the lid and the other end of the linerless wash-off label is attached to the container. For example, the container may be a returnable and/or reusable plastic container for food.

Face

The paper-based face may comprise natural fiber as its raw material. Natural fiber refers to any plant material that contains cellulose. The natural fiber may be wood-based. Paper-based face is well-suited with the increasing tendency to reduce the unnecessary use of plastic materials. Further, paper-based label can be arranged to fulfil the requirement of showing opening marks in case the container has been opened.

The paper-based face comprises a base paper and a release layer. The release layer and the pressure sensitive adhesive are arranged on opposite sides of the base paper. The pressure sensitive adhesive is arranged on a lower surface of the face opposite to its printable top surface.

Figure 2:
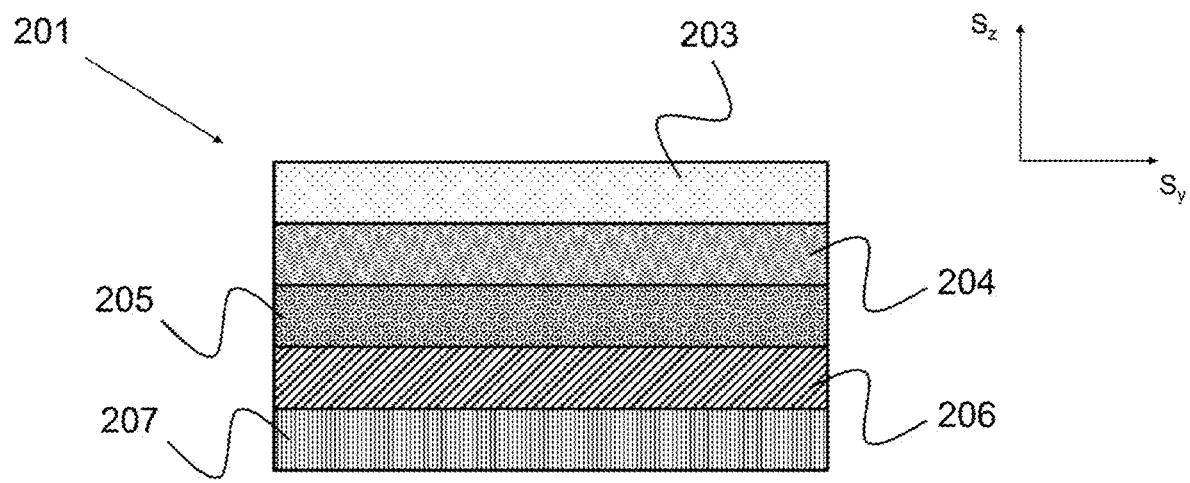
FIG. 2 illustrates, by way of an example, a cross-sectional view of a paper-based face.

The paper-based face further comprises a thermal layer and a pre-coating. The paper-based face may further comprise a barrier layer. In one example, also illustrated in FIG. 2, the paper-based face 201 comprises the following layers in the following order: 1) release layer 203, 2) thermal layer 204, 3) pre-coating 205, 4) base paper 206 and 5) barrier layer 207. When barrier layer is present, it is the receiving surface of the adhesive of the linerless wash-off label. In case of a barrier layer not being present, the base paper is the receiving surface of the adhesive.

In order to ensure washability of the linerless wash-off label, the face must allow water to be penetrated and/or migrated to underside of the label. Thus, certain hydrophilicity of the label is required. Hydrophilicity of the label is expressed in terms of water absorptiveness. Water absorptivity also referred to as wettability may be determined by measuring the quantity of water that can be absorbed by a surface of a paper in an given time. Water absorptiveness is a function of various paper characteristics such as sizing, porosity, etc. The water absorptiveness may be determined according to ISO standard 535, which may also be called a Cobb method.

The base paper of the face of the linerless wash-off label has a water absorptiveness of from 10 to 30 $g/m^2$ when measured according to an ISO standard 535 using contact time of 60 s. Conditioning of the water absorptiveness test samples is carried out under the standard conditions specified in ISO standard 187. In an example, the base paper of the face of the linerless wash-off label has a water absorptiveness of from 15 to 25 $g/m^2$, such as from 20 to 25 $g/m^2$. The water absorptiveness of the base paper falls into the given ranges in both cases: when measured from the thermal layer/face side (top side) and from the reverse side (under side).

The base paper has a basis weight of from 70 to 90 $g/m^2$ and thickness of from 70 to 90 µm. The base paper may have a tensile strength of from 5.0 to 7.0 kN/m in MD and from 3.0 to 5.0 KN/m in CD, when measured by ASTM D828. The base paper may have a tearing resistance of from 400 to 420 mN in MD and from 450 to 470 mN in CD, when measured by ASTM D689.

The paper-based face, particularly the base paper, comprises wet strength resin. Wet strength resin comprised by the paper-based face is responsible for resisting a force of rupture. Also, disintegration of the paper fibers in the washing conditions may be decreased. The wet strength resins may include for example urea-formaldehyde (UF), melamine-formaldehyde (MF) and polyamide epichlorohydrin (PAE). The wet strength resin of the base paper may be included in the additives, the amount of which may be from 0.5 to 1.0 g/m$^2$.

The base paper may comprise fibers, filler pigment, binders and additives. In an example, the base paper may comprise from 40 to 70 g/m$^2$ fibers. The base paper may comprise from 4 to 8 g/m$^2$ filler pigment. An example of a filler pigment is calcium carbonate. The base paper may comprise from 1 to 3 g/m$^2$ binders. As already mentioned above, the base paper may comprise from 0.5 to 1.0 g/m$^2$ additives, including wet strength resin.

Purpose of the release layer is to make the label material self-woundable. This means that the linerless label web with pressure sensitive adhesive on its one side (bottom side) and release coating forming the release layer on its other side (top side) can be self-wound around itself without tendency of blocking the adjacent layers of the label web to each other. The release coating forming the release layer may be silicone-based or non-silicone-based. The release layer may comprise one or more layers of release coating. Amount of release layer/release coating on the paper-based face may be from 0.5 to 1.0 g/m$^2$, such as 0.8 g/m$^2$. It may be preferable to have as low amount of release coating as possible from the washability perspective.

In an example, the release coating is silicone-based. The silicone-based release coating may comprise UV curable silicone, for example UV free radical silicone or cationic UV silicone. Non-thermally curable release coating, such as UV curable silicone, may be preferred when a thermal layer is present in the paper-based face, because curing of such layers will not heat the thermally sensitive components of the thermal layer.

When a thermal layer is included in the paper-based face, the face may be called a direct thermal printable face. The thermal layer provides thermal printability to the face. The thermal layer may comprise a colour former (such as a leuco dye), a developer (preferably phenol-free), an absorptive pigment (such as calcined clay), a binder (such as PVA, polyvinyl alcohol) and additives (including for example defoamers and surfactants). In an example, the amounts of the thermal layer components may be as follows: from 0.3 to 0.7 g/m$^2$ of colour former, from 0.6 to 1.0 g/m$^2$ of developer, from 0.3 to 0.7 g/m$^2$ of absorptive pigment, from 0.3 to 0.7 g/m$^2$ of binder, and/or from 0.3 to 0.7 g/m$^2$ of additives.

The optional pre-coating of the paper-based face may comprise pigment (such as calcined clay) and binder (such as starch and/or styrene butadiene latex). In an example, the pre-coating may comprise from 4 to 8 g/m$^2$ of pigment and/or from 1 to 3 g/m$^2$ of binder. The pre-coating may have effect of reducing heat transfer from a thermal coating to the base paper. This may enable enhanced or high resolution print to be formed. The pre-coating may have effect of providing smoothness to the face. Smoothness of the face has positive effect on printing, for example by providing better resolution. Thus, the pre-coating may have positive effect on printing quality.

The optional barrier layer (also called a reverse side barrier layer) may comprise PVA and kaolin. In an example, the barrier layer comprises from 0.3 to 0.7 g/m$^2$ PVA and/or from 1.0 to 2.0 g/m$^2$ kaolin.

Adhesive

The pressure sensitive adhesive of the linerless wash-off label is sensitive to washing conditions, as discussed above. The pressure sensitive adhesive comprises a water-based acrylic emulsion polymer composition. The pressure sensitive adhesive may comprise a surfactant for enabling the washability. Coat weight of the pressure sensitive adhesive may be from 13 to 25 g/m$^2$ (dry weight). It is preferable to have as low coat weight as possible to facilitate the washability. Further, low coat weight is also beneficial from the perspective of the raw material's usage. The pressure sensitive adhesive may be arranged as a monolayer or multilayer.

It is preferable that the pressure sensitive adhesive shows good anchorage to the paper-based face. This has an effect in preventing any adhesive residue accumulation in the label printing process to the printer. Further, it is important that the anchorage is such that the adhesive remains with the face when the wash-off label is exposed to washing conditions, leaving no adhesive remnants to the surface from which the label is detached. Further, as the adhesive remains with face in the washing conditions, no major contamination of the washing solution caused by the adhesive occurs.

In one embodiment the pressure sensitive adhesive is arranged to fully cover the adhesive receiving surface of the paper-based face. In another embodiment the pressure sensitive adhesive is arranged in at least two machine-direction oriented stripes leaving a non-adhesive area between them. For example, the adhesive stripes may have a width of from 3 to 7 mm, such as 5 mm, in cross-machine direction. The non-adhesive area may have a width of from 3 to 7 mm, such as 5 mm, in cross-machine direction. When full coverage of the adhesive is used, lower adhesive coat weight may be used than in the case of arranging the adhesive in stripes. In other words, when arranging the adhesive in stripes, a slightly higher coat weight may be needed to obtain high enough adhesion.

Arranging the adhesive in machine-direction oriented stripes leaving a non-adhesive area between them may be referred to as pattern gumming. Pattern gumming may be preferred from the materials' usage perspective, as less adhesive and thus less raw materials needs to be used when the adhesive is arranged in alternating adhesive stripes and non-adhesive stripes. More importantly, the non-adhesive areas may enhance the washability of the label, as they provide "tunnels" for the washing liquid/solution to enter the bottom side of the label, i.e. the adhesive side under the face and between the face and the labelled surface.

Method for Producing the Linerless Wash-Off Labels

The linerless wash-off labels disclosed herein are provided as part of a linerless label product roll comprising the linerless wash-off labels.

A method for producing a linerless wash-off label web for providing the linerless label product roll comprises arranging a paper-based face or a carrier as a substrate, and coating the substrate with pressure sensitive adhesive. The pressure sensitive adhesive comprises a water-based acrylic emulsion polymer composition, and the pressure sensitive adhesive is sensitive to washing conditions. The method also comprises drying and/or curing the pressure sensitive adhesive on the substrate. When the substrate is a carrier, the pressure sensitive adhesive is transferred from the carrier to a paper-based face. The method further comprises winding the paper-based face with the adhesive thereon into a roll of linerless wash-off label web. The paper-based face comprises a release layer, and in the final construction the pressure sensitive adhesive and the release layer are arranged on opposite sides of the paper-based face. The paper-based face comprises wet strength resin and has water absorptiveness of from 10 to 30 g/m² when measured according to an ISO standard 535 (contact time 60 s).

The linerless wash-off label product roll is manufactured by machine-direction slitting of the linerless wash-off label web.

Washability of the Linerless Wash-Off Label

As already mentioned, the linerless label disclosed herein is a wash-off label, which is removable (detachable) from a labelled surface during subsequent washing process. Washability is provided by the adhesive that is sensitive to washing conditions. Further, the properties of the face discussed above also play a role in washability.

The pressure sensitive adhesive of the linerless wash-off label disclosed herein has decreased adhesion at washing conditions. This means that the adhesion properties of the adhesive, such as tack and peel, are lowered in washing conditions. Practically, the tack and peel values of the adhesive after washing may be zero or negligible. Thus, the adhesive after the detachment by washing may not have any adhesion properties.

Washing conditions for detaching the linerless wash-off label as disclosed herein include a temperature of at least 20 degrees C. and aqueous washing solution. In an example, the washing conditions may comprise elevated temperature. The elevated temperature of the washing solution may refer to temperature above room temperature, such as at least 25 degrees C. At most, the temperature of the washing solution may be 90 degrees C. Preferably, the temperature of the washing solution is as low as possible or as close to the room temperature as possible from the energy efficiency perspective.

In an example, the linerless wash-off label disclosed herein is detachable from a labelled surface when exposed to an aqueous washing solution at a temperature of at least 20 degrees C.

In an example, the linerless wash-off label disclosed herein detachable from a labelled surface when immersing in an aqueous washing solution having a temperature of at least 20 degrees C.

In an example, the linerless wash-off label disclosed herein is detachable from a labelled surface when exposed to an aqueous washing solution under water pressure. The water pressure may be the order of that conventionally used in dishwashers, such as from 1.3 to 8.3 bar.

In an example, the linerless wash-off label disclosed herein is detachable from a labelled surface when exposed to an aqueous washing solution at a temperature of from 20 to 90 degrees C. For example, the linerless wash-off label may be detachable from a labelled surface when exposed to an aqueous washing solution having a temperature of 30 degrees C., 40 degrees C., 50 degrees C., 60 degrees C. or 65 degrees C.

As already discussed, the adhesion properties of the adhesive, such as tack and peel, preferably are lowered when exposing the label to washing conditions and practically the adhesive after the detachment by washing may not have any adhesion properties.

Tack refers to an adhesive's holding power (adhesion) upon contact with a substrate. An adhesive with high initial tack will grab the substrate quickly. An adhesive with low initial tack will exhibit a low level of adhesion when applied.

Tack can be measured by a loop tack measurement according to FINAT Test Method No. 9 (FTM 9). The loop tack value of the adhesive is expressed as the force required to separate, at specified speed, a loop of material brought into contact with a specified area of a surface.

Peel (also referred to as peel adhesion) refers to a measure of the adhesive's ability to wet out a surface of a substrate and subsequently adhere to the substrate. Peel thus may quantify the permanence of the adhesion or peel ability of the adhesive. Peel is defined as the force required to remove adhesive coated material from a test plate after a certain dwell time at an angle 90 degrees or 180 degrees and specified speed. Peel adhesion thus refers to final adhesion. Peel adhesion may be measured according to FINAT Test Method No. 1 or 2 (FTM 1, FTM 2).

According to an embodiment, the adhesive of the linerless wash-off label disclosed herein has an average tack on glass/HDPE/PET in a range of from 1.5 to 10 N, when measured according to FTM 9. After detachment from a labelled surface by washing, the adhesive of the linerless wash-off label disclosed herein may have an average tack on glass/HDPE/PET in a range of from 0 to 1 N.

According to an embodiment, the adhesive of the linerless wash-off label disclosed herein has an average peel on glass/HDPE/PET in a range of from 1.5 to 10 N, when measured according to FTM 1 or FTM 2. After detachment from a labelled surface by washing, the adhesive of the linerless wash-off label disclosed herein may have an average peel on glass/HDPE/PET in a range of from 0 to 1 N.

Washability, i.e., detachability from a labelled surface in washing conditions is also dependent on the nature of the substrate, i.e., the labelled surface. For example, the labels disclosed herein are more easily detached from a HDPE (high density polyethylene) surface than for example from PET (polyethylene terephthalate) or glass surface. Thus, lower temperature is needed to detach the label from a HDPE surface than from PET or glass surface.

Also, the washing conditions have an effect on the detachability. For example, when using immersion for the detachment, higher temperatures may be required compared to conditions including water pressure.

From the energy efficiency point of view, it is beneficial to get the label detached from the labelled surface as quickly as possible. According to an embodiment, the linerless wash-off label disclosed herein is detachable from the labelled surface in 90 seconds or less, such as in 70 seconds, 50 seconds or 30 seconds, when exposed to an aqueous washing solution.

In an example, the linerless wash-off label is detachable from the labelled surface in 90 seconds or less, when exposed to an aqueous washing solution having a temperature of from 40 to 65 degrees.

The aqueous washing solution may be pure/plain water or it may contain an alkaline agent. Pure or plain water refers to water that does not have any additional ingredient included in it. For example, pure water may refer to tap water. Pure water does not have to be purified water, but it may be purified for example by distillation or deionization. The alkaline agent may be for example NaOH, KOH, sodium carbonate, dishwashing liquid, alkaline detergent or any combination thereof. When alkaline agent is included in the washing solution, the washing conditions are alkaline. The alkaline washing conditions may typically contain about 0.5-10% or 1-4% (by weight) of the alkaline agent(s). For example, the washing solution may contain about 2% (by weight) alkaline agent(s).

When pure water with no alkaline agent is used as the washing solution, it may not be necessary to include a separate rinsing step after the washing step that is responsible for detachment of the label. However, when alkaline washing conditions are used, a rinsing step utilizing pure water is required for rinsing possible remnants of the alkaline agent away.

EXAMPLES

Examples 1-3

For the examples 1-3 a paper-based face having the following construction was utilized:
1) silicone release layer with a coat weight of 0.5-1.0 g/m$^2$
2) thermal layer comprising
   leuco dye as a colour former
   phenol-free developer
   absorptive pigment
   binder
3) pre-coating comprising calcined clay as pigment and a binder
4) base paper comprising
   about 60 g/m$^2$ fibers
   filler pigment
   binders
   additives including wet strength resin
5) reverse side barrier layer comprising PVA and kaolin.

The base paper has a water absorptiveness of 22.5 g/m$^2$ when measured from the thermal layer side and 21.0 g/m$^2$ when measured from the reverse side. The water absorptiveness was measured according to an ISO standard 535 with contact time of 60 s. Conditioning of the test samples was carried out under the standard conditions specified in ISO standard 187.

The linerless wash-off label of the examples 1-3 comprises a pressure sensitive adhesive comprising a water-based acrylic emulsion polymer composition arranged next to the reverse side barrier layer of the face.

The exemplary labels 1-3 have a (machine-direction) length of 15 cm and a (cross-machine direction) width of 5.8 cm (58 mm).

Example 1 is a linerless wash-off label, wherein the pressure sensitive adhesive is arranged in 5-5-5 pattern, wherein the width of the machine-direction continuous adhesive stripes is 5 mm and the width of the non-adhesive area between the adhesive stripes is 5 mm. Adhesion properties of the label were as follows: average tack on glass 6.04 N, when measured according to FTM 9; average tack on HDPE 2.15 N, when measured according to FTM 9; average tack on PET 3.32 N, when measured according to FTM 9; average peel on glass 3.52 N, when measured according to FTM 1 or FTM 2; average peel on PET 2.68 N, when measured according to FTM 1 or FTM 2; and average peel on HDPE 1.91 N, when measured according to FTM 1 or FTM 2.

Example 2 is a linerless wash-off label, wherein the pressure sensitive adhesive is arranged in 3-3-3 pattern, wherein the width of the machine-direction continuous adhesive stripes is 3 mm and the width of the non-adhesive area between the adhesive stripes is 3 mm.

Example 3 is a linerless wash-off label, wherein the pressure sensitive adhesive is arranged in 5-7-5 pattern, wherein the width of the machine-direction continuous adhesive stripes is 5 mm and the width of the non-adhesive area between the adhesive stripes is 7 mm. Adhesion properties of the label were as follows: average tack on glass 4.87 N, when measured according to FTM 9; average tack on HDPE 3.20 N, when measured according to FTM 9; average tack on PET 2.84 N, when measured according to FTM 9; average peel on glass 3.06 N, when measured according to FTM 1 or FTM 2; average peel on PET 2.55 N, when measured according to FTM 1 or FTM 2; and average peel on HDPE 2.08 N, when measured according to FTM 1 or FTM 2.

Washability of the labels was studied by immersing a labelled item into pure water in a beaker. The item was a PP (polypropylene) container. Water temperature was 63 degrees C. The times needed for the full detachment of the label were measured for three parallel samples and are shown in Table 1 below.

TABLE 1

|  | Time | Time | Time |
| --- | --- | --- | --- |
| Example 1 | 32 s | 36 s | 27 s |
| Example 2 | 29 s | 49 s | 33 s |
| Example 3 | 94 s | 48 s | 78 s |

The examples 1-3 demonstrate that with hydrophilic paper-based face and a pressure sensitive adhesive comprising a water-based acrylic emulsion polymer composition arranged in a pattern comprising adhesive stripes and non-adhesive areas therebetween, very good washing times in pure water can be achieved.

Example 4

For the labels of example 4, the paper-based face had similar construction as that used in examples 1-3, except that no release layer was present.

The linerless labels of example 4 had a pressure sensitive adhesive comprising a water-based acrylic emulsion polymer composition arranged next to the reverse side barrier layer of the face. The adhesive receiving side of the face was fully covered with the adhesive. Adhesive coat weight was 16-17 g/m$^2$. The labels had a (machine-direction) length of 4 cm and a (cross-machine direction) width of 2.5 cm.

Three labels were attached to a bottle consisting of HDPE and washability of the labels was studied by immersing the labelled bottle in pure water in a beaker. Water was stirred by a magnetic stirrer. The labels were attached in different positions such that one label was arranged closer to the top of the bottle, another label was arranged closer to the bottom of the bottom and the third label was arranged between the two previous labels. Water temperature was 20, 30 or 40 degrees C. The times needed for the full detachment of each of the labels were measured.

In water having a temperature of 20 degrees C. it took from about 2.5 minutes to about 6 minutes for the labels to detach. Similarly, at temperature of 30 degrees, the detachment times varied from about 2.5 minutes to about 6 minutes. In water having a temperature of 40 degrees the detachment times were significantly lower, typically varying from about 50 seconds to about 90 seconds. Positioning of the label was shown to have some, but not remarkable effect on the time needed for the detachment.

Example 4 shows that the labels are detachable in pure water even at low temperatures. If very fast detachment is required, then elevated temperatures, such as about 40 degrees C. may be preferred.

The invention claimed is:

1. A linerless wash-off label (100) comprising a paper-based face (101, 201) and pressure sensitive adhesive (102), wherein
the paper-based face (101, 201) comprises a base paper (206) and a release layer (203), the release layer (203) and the pressure sensitive adhesive (102) being arranged on opposite sides of the base paper (206),
the pressure sensitive adhesive (102) comprises a water-based acrylic emulsion polymer composition,
the pressure sensitive adhesive (102) is sensitive to washing conditions, and
the base paper (206) comprises wet strength resin and has water absorptiveness of from 10 to 30 $g/m^2$ when measured according to an ISO standard 535 (contact time 60 s).

2. The linerless wash-off label (100) according to claim 1, wherein the pressure sensitive adhesive (102) is arranged in at least two machine-direction continuous stripes, the stripes leaving a non-adhesive area between them.

3. The linerless wash-off label (100) according to claim 1, wherein the pressure sensitive adhesive (102) is arranged to fully cover one side of the paper-based face (101, 201).

4. The linerless wash-off label (100) according to claim 1, wherein the pressure sensitive adhesive (102) comprises a surfactant.

5. The linerless wash-off label (100) according to claim 1, wherein the paper-based face (101, 201) is a direct thermal printable face.

6. The linerless wash-off label (100) according to claim 1, wherein a coat weight of the pressure sensitive adhesive (102) is 13-25 $g/m^2$.

7. The linerless wash-off label (100) according to claim 1, wherein a coat weight of a release coating forming the release layer (203) is 0.5-1.0 $g/m^2$.

8. The linerless wash-off label (100) according to claim 1, wherein the linerless wash-off label (100) is detachable from a labelled surface when exposed to an aqueous washing solution at a temperature of at least 20 degrees C.

9. The linerless wash-off label (100) according to claim 1, wherein the linerless wash-off label (100) is detachable from a labelled surface when immersing in an aqueous washing solution having a temperature of at least 20 degrees C.

10. The linerless wash-off label (100) according to claim 1, wherein the linerless wash-off label (100) is detachable from a labelled surface when exposed to an aqueous washing solution at elevated temperature.

11. The linerless wash-off label (100) according to claim 1, wherein the linerless wash-off label (100) is detachable from a labelled surface when exposed to an aqueous washing solution under water pressure.

12. The linerless wash-off label (100) according to claim 1, wherein the linerless wash-off label (100) is detachable from the labelled surface in 90 seconds or less, when exposed to an aqueous washing solution.

13. A linerless label product roll comprising the linerless wash-off labels (100) according to claim 1.

14. A labelled item comprising an item and a linerless wash-off label (100) according to claim 1, wherein the linerless wash-off label (100) is attached to a surface of the item via the pressure sensitive adhesive (102) of the linerless wash-off label.

15. The labelled item according to claim 14, wherein the item is a plastic item, glass item or metal item.

16. The labelled item according to claim 14 or 15, wherein the item is a container comprising a lid, and one end of the linerless wash-off label is attached to the lid and the other end of the linerless wash-off label is attached to the container.

17. A method of manufacturing a linerless wash-off label web for providing the linerless label product roll according to claim 13, the method comprising
arranging a paper-based face (101, 201) or a carrier as a substrate,
coating the substrate with pressure sensitive adhesive (102),
drying and/or curing the pressure sensitive adhesive (102) on the substrate,
in case of the substrate being a carrier, transferring the pressure sensitive adhesive (102) from the carrier to a paper-based face (101, 201), and
winding the paper-based face (101, 201) with the adhesive (102) thereon into a roll of linerless wash-off label web,
the paper-based face (101, 201) comprising a base paper (206) and a release layer (203),
wherein
the pressure sensitive adhesive (102) and the release layer (203) are arranged on opposite sides of the base paper (206),
the pressure sensitive adhesive (102) comprises a water-based acrylic emulsion polymer composition,
the pressure sensitive adhesive (102) is sensitive to washing conditions, and
the base paper (206) comprises wet strength resin and has water absorptiveness of from 10 to 30 $g/m^2$ when measured according to an ISO standard 535 (contact time 60 s).

* * * * *